(No Model.)
G. P. PEARSON & J. A. FOSTER.
BARREL STAND.
No. 438,486. Patented Oct. 14, 1890.
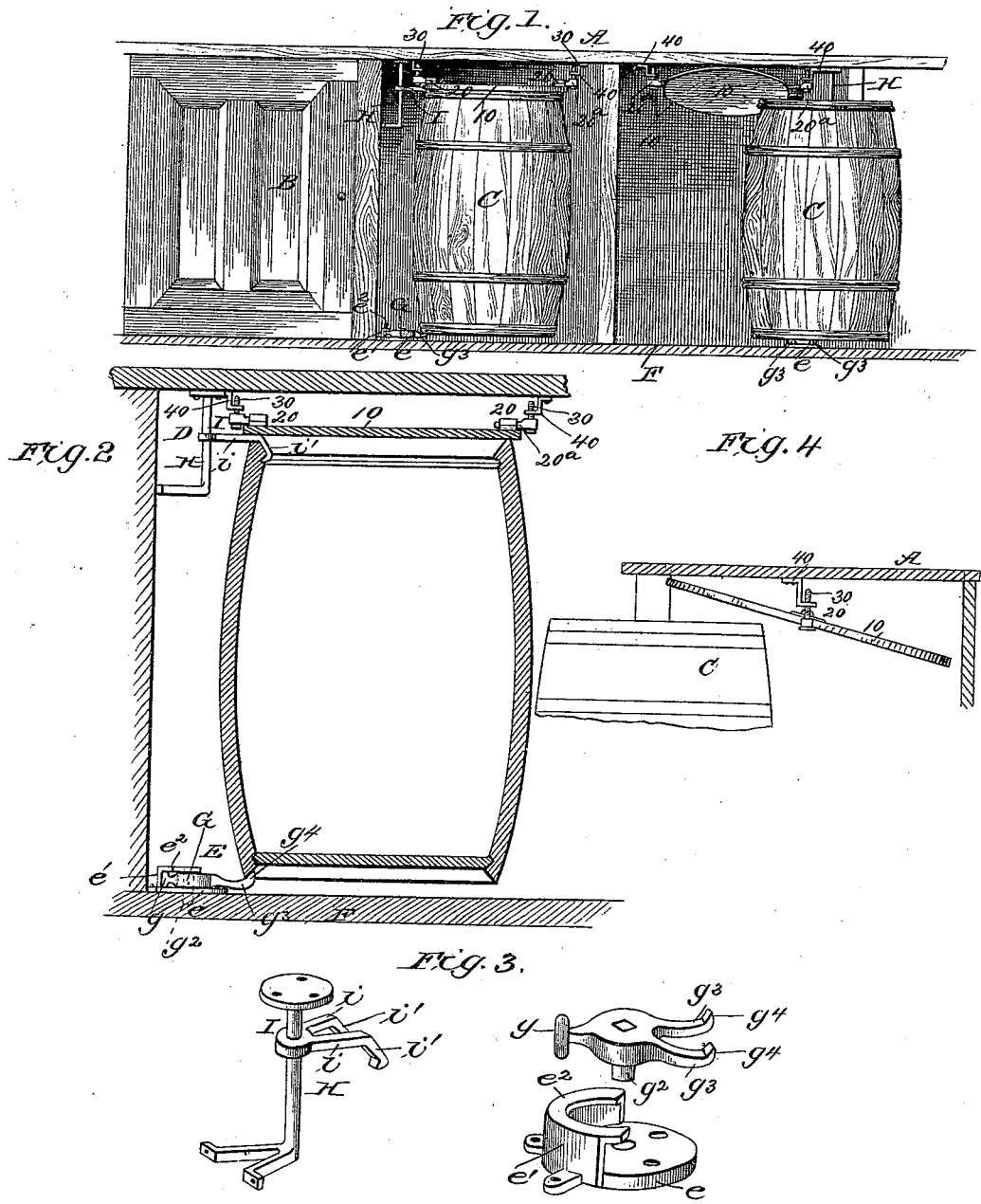
WITNESSES:
Fred G. Dieterich
Jos. A. Ryan
INVENTOR:
George P. Pearson,
John A. Foster.
BY Munn & Co
ATTORNEYS

UNITED STATES PATENT OFFICE.

GEORGE P. PEARSON AND JOHN A. FOSTER, OF ATTICA, INDIANA.

BARREL-STAND.

SPECIFICATION forming part of Letters Patent No. 438,486, dated October 14, 1890.

Application filed July 10, 1890. Serial No. 358,335. (No model.)

*To all whom it may concern:*

Be it known that we, GEORGE P. PEARSON and JOHN A. FOSTER, residing at Attica, in the county of Fountain and State of Indiana, have invented a certain new and useful Combined Swinging Barrel Stand and Cover for Store-Counters, of which the following is a specification.

Our invention has for its object to provide simple and effective means whereby barrels and the like may be supported on suitably-arranged supports secured to a store-counter in such a manner that the same may be readily swung from under the counter to admit of ready access thereto when desired.

A further object is in combining with said barrel-stand a peculiarly-arranged cover adapted to automatically fit over the barrel as it is pushed in place.

To this end our invention consists in sundry novel features of construction and peculiar combination of parts, all of which will hereinafter be fully described in the annexed specification, and particularly pointed out in the claims, reference being had to the accompanying drawings, in which—

Figure 1 is a rear view of a store-counter with our improvements applied, showing one of the barrels swung to its outward position. Fig. 2 is a longitudinal section. Fig. 3 is a detail perspective view of the barrel-supports detached; and Fig. 4 is a transverse section on the line 4 4, Fig. 1, the barrel being shown swung outward.

In the accompanying drawings, A indicates a store-counter provided with a series of hinged doors B, which cover compartments in each of which is located a barrel C, mounted to be swung outward from under the counter when any of said doors B are opened.

The means for holding the barrel under the counter consist of the upper support D and the lower support E, said lower support consisting of a circular disk or plate $e$, screwed or otherwise secured to the timber or floor F, said plate provided with an upward projection $e'$, having an inwardly-extending flange $e^2$ extending around the rear half of its circumference, said flanged extension forming a guideway for the inner end $g$ of the clutch-plate G, supported on said disk $e$, held to swing horizontally on the stud or pin $g^2$, which extends through said clutch-plate G and the disk $e$ into the timber F, as shown. The forward portion of said clutch-plate is extended outwardly into diverging arms $g^3$ $g^3$, provided with upwardly-projecting fingers $g^4$ $g^4$, which serve to extend under the chine of the bottom of the barrel, as shown.

The upper support consists of a vertical rod H, secured to the under side of the counter, upon which is supported a clutch member I, formed with outwardly-extending diverging arms $i$ $i$, provided with grapple-hooks $i'$ $i'$, which fit over the upper end of the barrel into the croze or groove of said barrel, as shown. The rear end of the clutch I is formed into an eye which fits on the rod H, and is vertically adjustable thereon, so as to adapt said clutch to engage with barrels of various heights.

10 10 indicate the barrel-covers, which are pivotally supported on the pintles $20^a$, by means of the sockets 20, as most clearly shown in Fig. 2 of the drawings, said sockets being so arranged that the rear end of the said covers will overbalance the forward ends, for a purpose presently described, said pintles $20^a$ being held upon adjusting-screws 30 30, operating in the brackets 40 40. By this arrangement the barrel-cover may be adjusted to fit over barrels of different heights.

From the foregoing description, taken in connection with the drawings, the operation and advantages of our improvement will be readily understood.

By arranging the lower support in the manner described it will be observed that the clutch $e$ will always be held with its rear end in engagement with the flanged projection $e'$, any undue strain on the stud or pin $g^2$ being thereby avoided. By arranging the hinged cover as described, in connection with the swinging barrel-stand, it will be seen that when it is desired to swing the barrel out the rear end of the cover, being slightly heavier than the front end, will drop down, as shown in Fig. 4, and when the barrel is moved back the upper portion will strike against said rear end and lift it to a horizontal position.

Our invention is exceedingly simple, can be manufactured at a small cost, and is adapted

Having thus described our invention, what we claim, and desire to secure by Letters Patent, is—

1. In a swinging barrel-stand for store-counters, the combination, with a disk secured to the floor or base of the counter having an upward projection extending from a portion of its peripheral edge, said projection provided with a horizontal flange, of a clutch member journaled on said floor-disk provided with a rearward extension projected under the flange, forwardly-projected diverging arms having upwardly-extending fingers adapted to engage the chine of the lower edge of the barrel, and a laterally-swinging clutch member secured below the top of the counter adapted to engage and hold the upper part of the barrel, substantially as and for the purpose described.

2. In a swinging barrel-support for store-counters, the combination, with the lower support E, consisting of a disk or plate secured to the base or floor, provided with a semicircular flanged projection $e'$, the clutch member G, formed with a depending stud $g^2$, journaled in said floor-disk to swing laterally thereon, provided with a rearward extension adapted to project under said flanged projection $e'$, and forwardly-extending diverging arms, having upturned fingers adapted to engage the lower chine of the barrel, of the upper clutch consisting of a vertical rod secured to the counter, the member I, formed with diverging arms having grappling ends adapted to project over the open end of the barrel and engage the croze, the rear end of said member secured to and adapted for vertical adjustment on the rod, substantially as and for the purpose described.

3. The combination, with the swinging barrel-supports, substantially as shown, and a barrel held thereon, of the cover 10, formed with sockets 20, the vertically-adjustable pintles 20$^a$, adapted to engage the sockets, said sockets disposed on said cover, whereby its rear end will overbalance the forward end, substantially as and for the purpose described.

GEORGE P. PEARSON.
JOHN A. FOSTER.

Witnesses:
J. ALLEN WILSON,
CHARLES R. MILFORD.